UNITED STATES PATENT OFFICE.

JOSEPH KORNITZER, OF NEW YORK, N. Y.

IMPROVEMENT IN MEDICAL COMPOUNDS.

Specification forming part of Letters Patent No. 126,637, dated May 14, 1872.

*To all whom it may concern:*

Be it known that I, JOSEPH KORNITZER, of the city, county, and State of New York, have invented a new and useful Medical Compound for the cure of diarrhea, scrofula, and other diseases, of which the following is a specification:

The nature of my invention consists in compounding certain medical ingredients of a healthful and invigorating nature, to be used as a dietetic remedy for the prevention and cure of the several diseases hereinafter mentioned—namely: First, in pædatrophia, a scrofulous intestinal disease which is common among children, and is generally known as "wasting disease of infants and children." Second, in all cases of diarrhea, both in adults and children. Third, in all diseases of the kidneys and bladder, especially those consequent to long-standing fevers, and excesses in the use of alcoholic drinks. Fourth, in summer-complaint, after the vomiting and fever have been subdued, for the final cure of the dangerous protracted diarrhea which generally follows the same. Fifth, as a preventive against excessive menstrual bleeding, both in young and married ladies, and against hemorrhage of the womb in child-birth. Sixth, in cases of poor blood, and in nervousness and dyspepsia arising therefrom. My invention is also very efficacious in heavy fevers, when tonics and easily digestible food are requisite, as it will prove agreeable and acceptable to the patient, even when there is a total loss of appetite for other food; likewise, in cases where a free use of milk is recommended, as in consumption, a proportion of my remedy being mixed with the milk will render the latter more digestible and palatable, and will prevent diarrhea. It is also a very efficacious preventive against fevers in malarious countries.

The formula of my improved compound is as follows, viz.: Eleven parts of the best coffee, four parts of *rubia tinctorum*, one part of cinnamon.

These ingredients I thoroughly mix—and I may here state that I do not confine myself to the exact proportions of the several ingredients, as above mentioned, as these may be slightly varied without materially affecting the object and efficacy of my invention.

To prepare my remedy for use, I put a suitable quantity of water into a clean earthen vessel and heat it. When boiling, I put in a quantity of my mixture or compound, in the proportion of about three or four heaped teaspoonfuls to one pint of water, and then allow it to boil slowly, under cover, for ten or fifteen minutes, after which I strain it, and it is then ready for use. It may then be mixed with a suitable quantity of milk, and sweetened with sugar to suit the taste. For infants, I use one part of the decoction to ten or fifteen parts of milk; for children taking other food, one part of the decoction to three or four parts of milk; and for adults, one part of the decoction to one part of milk.

Having thus described my invention, what I claim as new, and desire to secure by Letters Patent of the United States, is—

An improved medical compound, composed of the ingredients and prepared in the manner substantially as herein described, and for the purposes set forth.

JOSEPH KORNITZER.

Witnesses:
   CHAS. ROGERS,
   A. MOORE.